United States Patent [19]

Schaller et al.

[11] 3,807,098

[45] Apr. 30, 1974

[54] PLURAL GRINDING STATIONS WITH MASTER CONTROLLER

[75] Inventors: Robert L. Schaller, Camillus, N.Y.; Robert E. Malton, Cranford, N.J.

[73] Assignee: Sundstrand Syracuse Inc., Syracuse, N.Y.

[22] Filed: June 14, 1972

[21] Appl. No.: 262,768

[52] U.S. Cl. .......................... 51/165.71, 51/165.91
[51] Int. Cl. ............................................. B24b 49/04
[58] Field of Search ........ 51/103 R, 103 TF, 165 R, 51/165.71, 165.91, 139; 318/562

[56] References Cited
UNITED STATES PATENTS

| | | | |
|---|---|---|---|
| 3,417,235 | 12/1968 | Clark et al. | 318/562 X |
| 2,937,478 | 5/1960 | Maker | 51/165.71 |
| 2,897,638 | 8/1959 | Maker | 51/165.71 |
| 3,271,909 | 9/1966 | Rutt | 51/165 R |
| 2,572,374 | 10/1951 | Oas | 51/139 |
| 3,694,970 | 10/1972 | Schoonover | 51/165.71 |
| 2,503,761 | 4/1950 | Murray | 51/103 TF |
| 3,503,156 | 3/1970 | Schaller | 51/103 R |

Primary Examiner—Harold D. Whitehead
Attorney, Agent, or Firm—Hofgren, Wegner, Allen, Stellman & McCord

[57] ABSTRACT

A centerless grinding system having plural grinding stations and powered feed stations is controlled by a master controller/computer. Offsets to maintain a common pass line are automatically calculated based on input bar size as measured by a preprocess gauge. During a set-up mode, controllers for each grind station are responsive to the calculated offsets to move an associated regulating wheel, blade rest, and grinding head through predetermined sequences. During a run mode, the bars are automatically maintained on the common pass line under control of transducers which monitor wear and actual output bar size.

14 Claims, 10 Drawing Figures

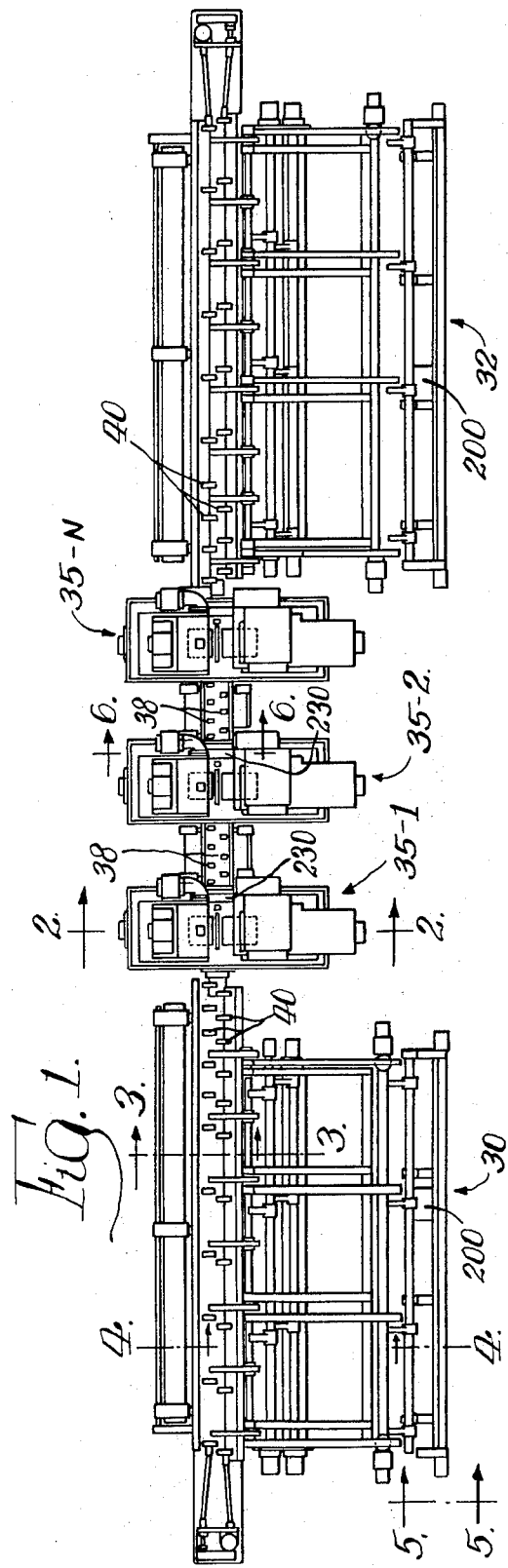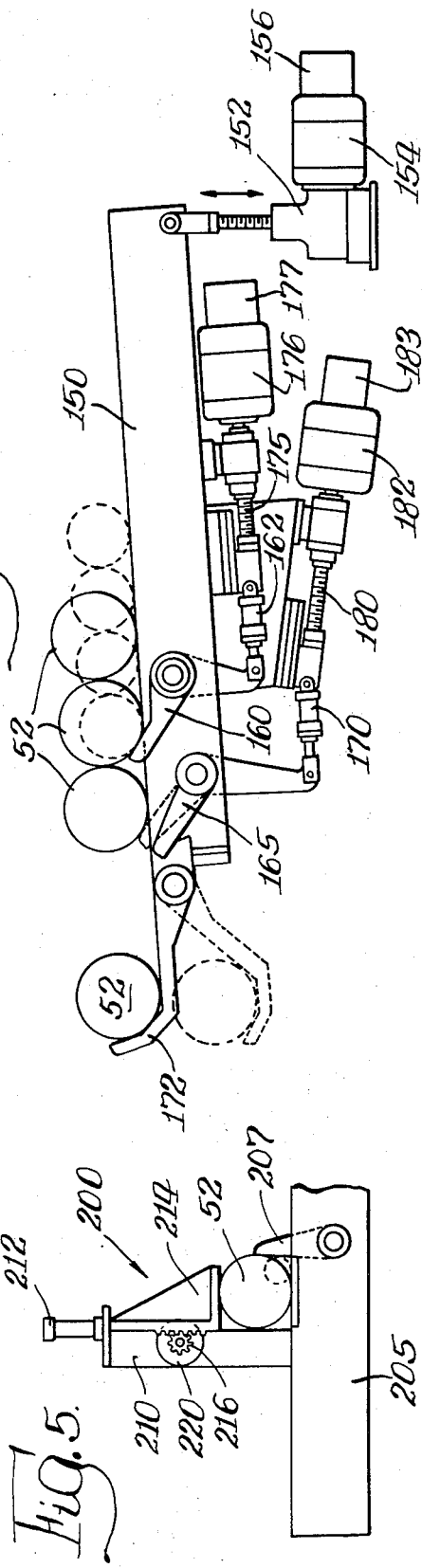

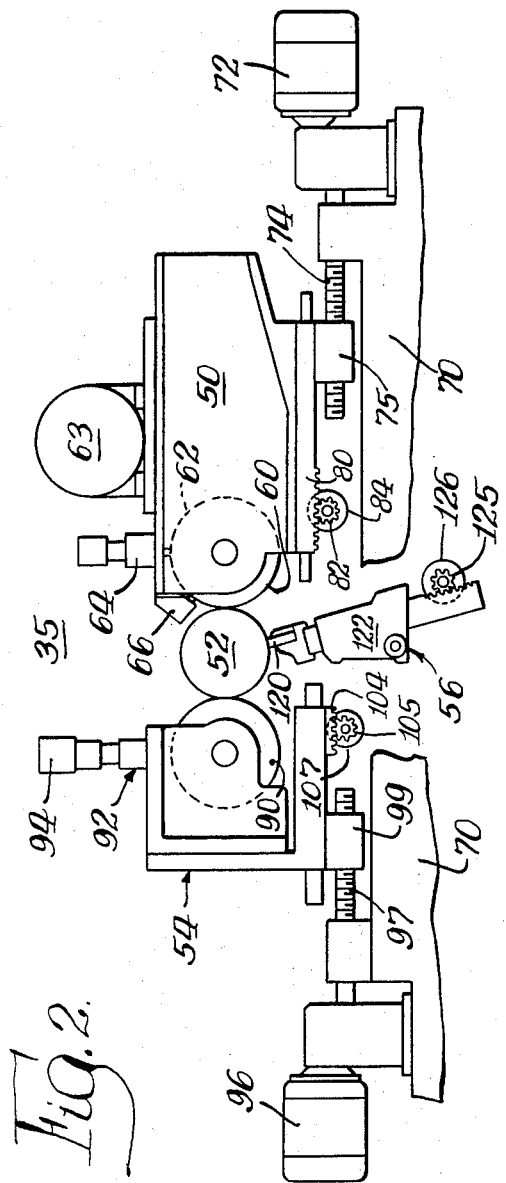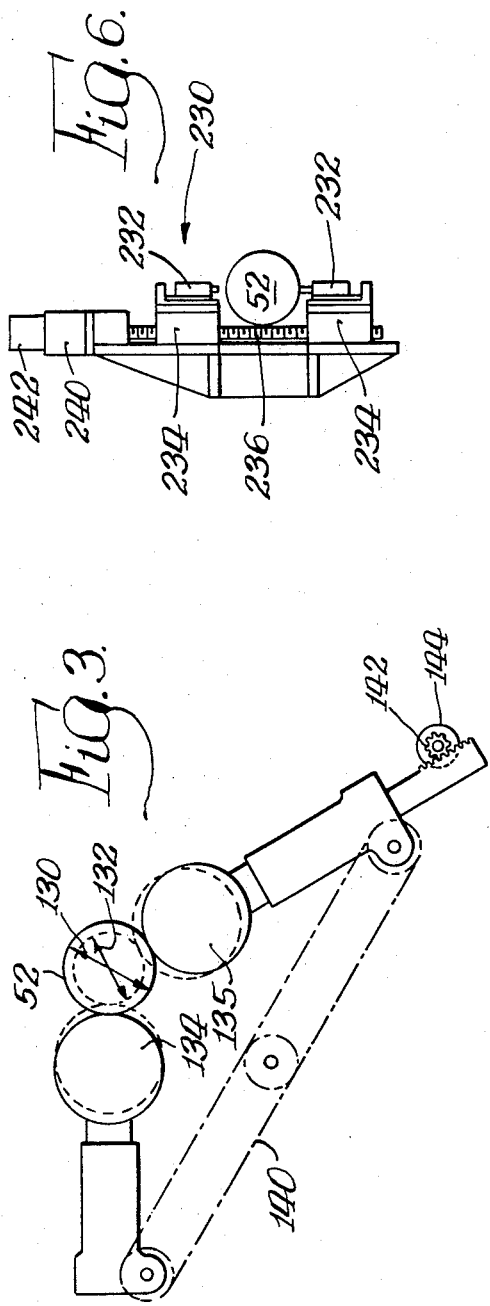

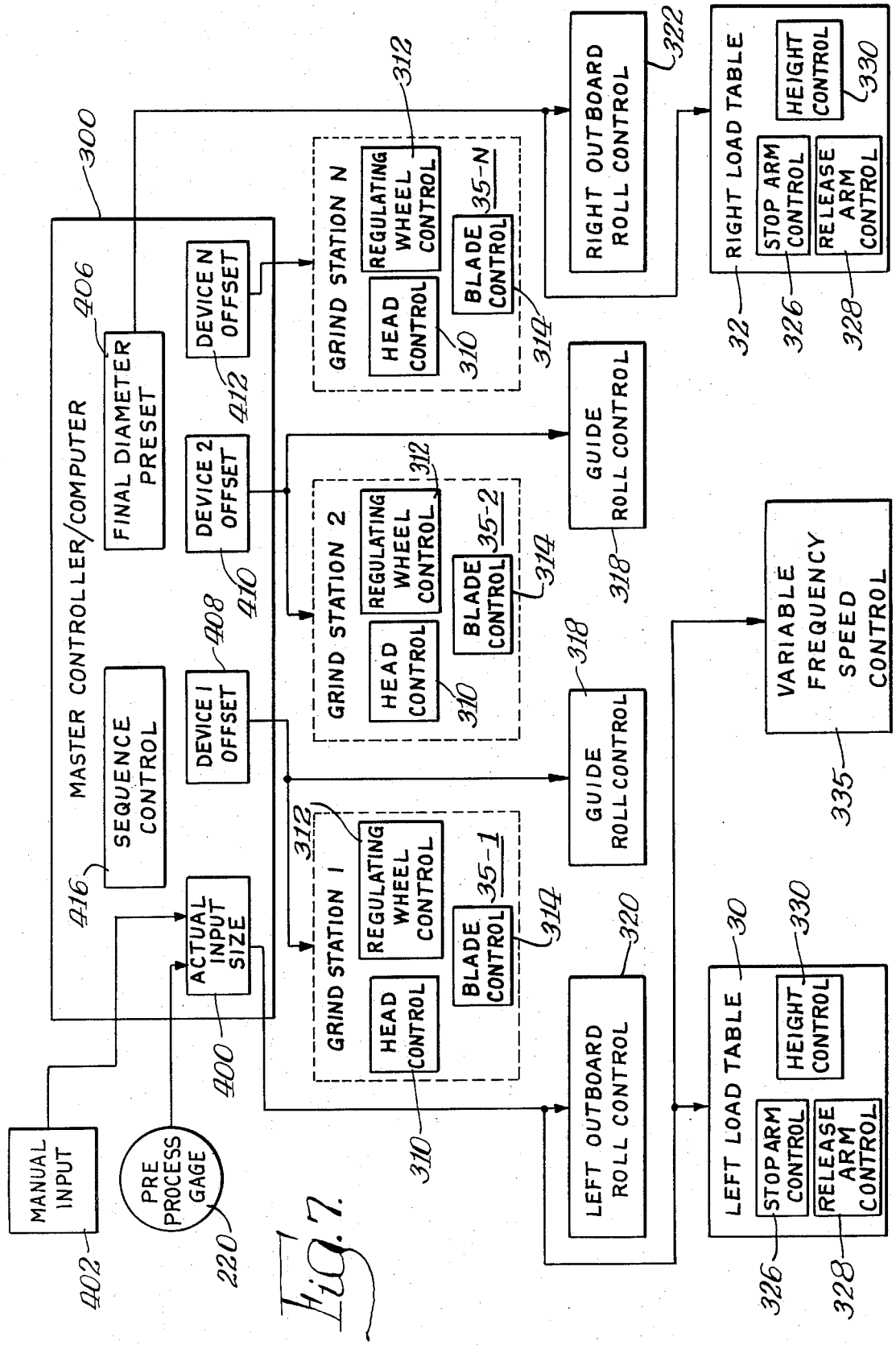

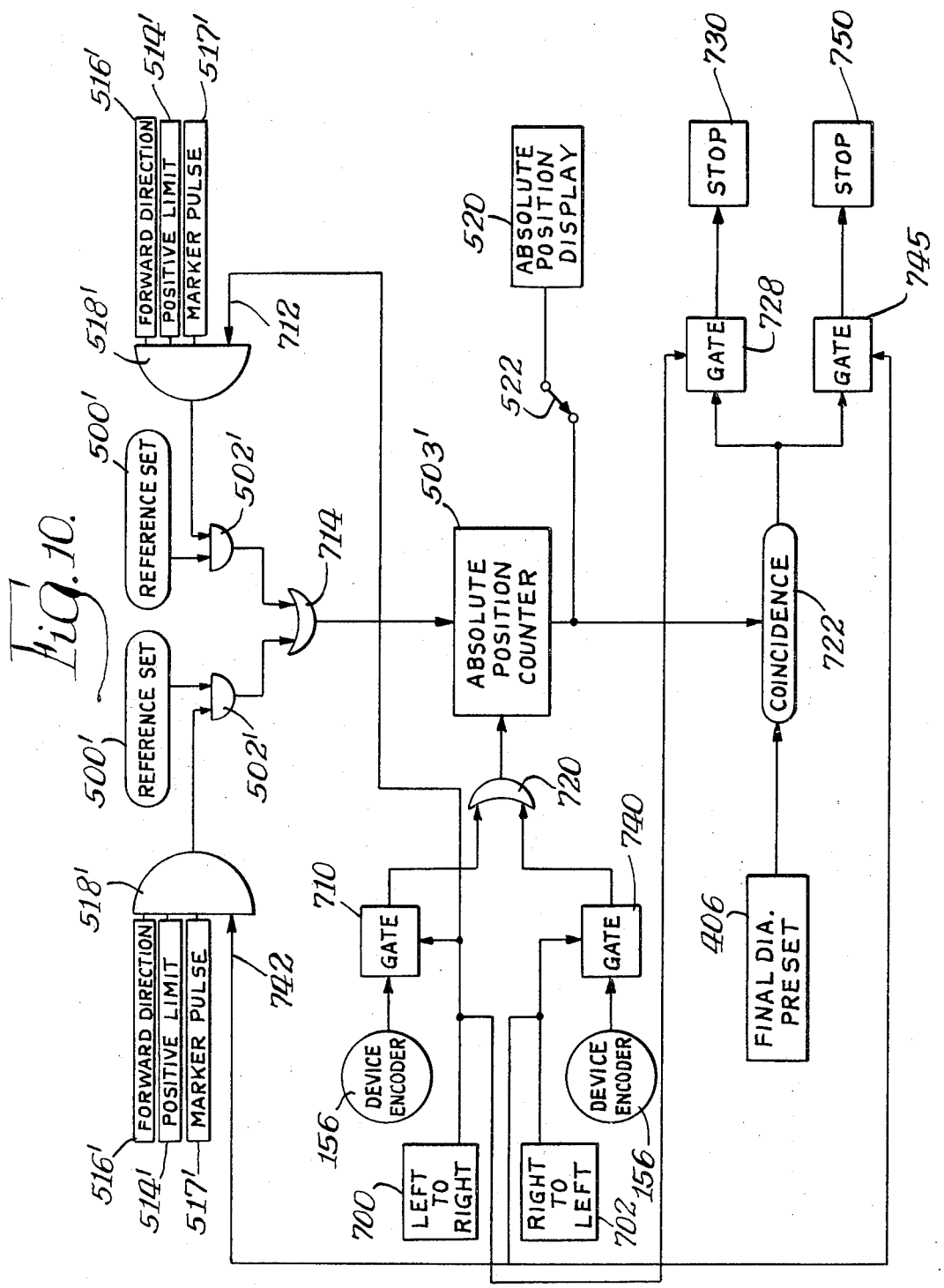

PLURAL GRINDING STATIONS WITH MASTER CONTROLLER

BACKGROUND OF THE INVENTION

This invention relates to a master controller for a grinding system having a plurality of grinding stations.

To adjust a multi-station grinding system for bars of different diameters is a time consuming operation. Each grinding station includes a plurality of movable components which must be individually adjusted or offset to positions which depend on the diameter of the bar which will be fed through that station. Various time consuming manual calculations must be made to determine the individual offsets which then input to numerical controlled apparatus for controlling the adjustments.

Rapid changeover has not been possible due to the lack of transducers for measuring bar diameters at various stages during the grinding process, and automatically making corresponding adjustments if needed. Although standard tolerances are common in the industry, grinding systems have not been capable of automatically using such standards to coordinate in proper sequence the individual component movements which must occur. These problems are magnified for more complex grinding systems, such as a centerless grinder which maintains bars of all diameters on a preselected grinding axis.

SUMMARY OF THE INVENTION

In accordance with the present invention, many of the time consuming calculations and manual inputs heretofore necessary to set-up a multi-station grinding system have been eliminated. A master controller or computer is responsive to input bar size, and either a desired final bar size or programmed standard sizes, to determine the device offsets necessary for each controlled component. The input bar size may be automatically supplied from a preprocess gauge located at a load table which receives the bars to be ground. Since different controlled components have different rates of movement, a sequence control moves the components in cascade to reduce overshooting or hunting which otherwise might occur. The system is particularly useful to control a centerless grinding system.

While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

BRIEF DESCRIPTION OF THE DRAWINGS

FIG. 1 is a top plan view of a centerless grinding system including load and unload tables, plural grinding stations, and associated powered feed rolls;

FIG. 2 is a cross-section of one grinding station, taken along lines 2—2 of FIG. 1;

FIG. 3 is a cross-section of a feed roll assembly, taken along lines 3—3 of FIG. 1;

FIG. 4 is a cross-section of a load/unload table, taken along lines 4—4 of FIG. 1;

FIG. 5 is an end elevational view of a preprocess gauge, taken along lines 5—5 of FIG. 1;

FIG. 6 is an end elevational view of an in-process gauge associated with each grinding station, taken along lines 6—6 of FIG. 1;

FIG. 7 is a block diagram of a master controller/computer for controlling the grinding system shown in FIGS. 1–6;

FIG. 10 is a partly block and partly schematic diagram of a controller for the left and right load/unload tables shown in FIG. 7.

BRIEF DESCRIPTION OF THE PREFERRED EMBODIMENT

Figure 8:
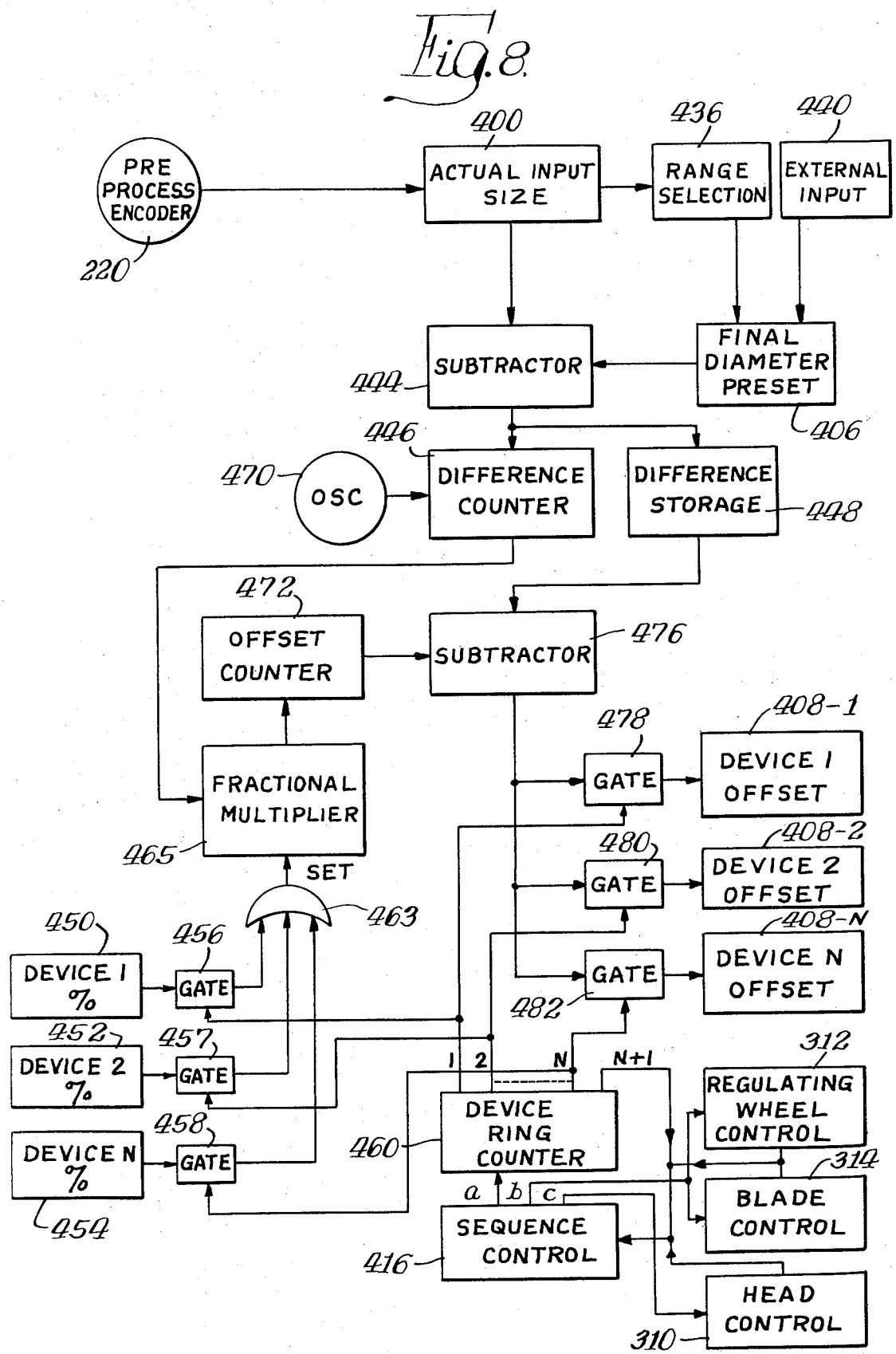
FIG. 8 is a partly block and partly schematic diagram of portions of the master controller/computer shown in block form in FIG. 7.

FIG. 1 illustrates a centerless grinding system having a left load/unload table 30, a right load/unload table 32, and a plurality of grinding machines or stations 35. For convenience, only three grinding stations have been illustrated, but it will be appreciated that any number 1, 2 . . . N may be located in cascade to grind a bar on a common pass line. Each illustrated grinding station 35 is further identified by a number identifying its particular position 1, 2 . . . N in the system. To feed work bars, a plurality of powered guide rolls 38 are located between each grinding station 35. Powered outboard rolls 40 are associated with both the left and right worktables 30 and 32, for feeding the bar from a storage position to the powered axis of the grinding system.

The centerless grinding system described above is conventional in nature, and is illustrated in more detail in FIGS. 2–4. In FIG. 2, one grinding machine 35 is illustrated in cross-section. The grinding machine includes a grinding head 50 and means for supporting a work bar 52, which may have a variety of diameters, on a common pass line or center line. The work support means typically includes a regulating wheel assembly 54 and a work rest structure 56.

Grinding head 50 has a grinding element 60, such as an abrasive belt, trained over a contact wheel 62 journaled in a yoke assembly, and rotated under control of an electric motor 63 through a suitable drive mechanism, not illustrated. A dresser 64 is located in contact with the grinding element. A wear encoder 66 monitors the amount of wear of the abrasive belt.

The grinding head 50 is supported for linear movement with reference to a base 70. An actuator 72 drives a ball screw 74 threaded in a nut 75 attached to the grinding head assembly 50. For purposes of accurate positioning of the head assembly, the head assembly 50 includes a rack 80 which drives a pinion 82 affixed to a shaft of a rotary position encoder 84 for sensing the actual movement of the grinding head assembly.

Regulating wheel assembly 54 includes a regulating wheel 90 which contacts the work bar 52. A regulating wheel dresser and diameter compensation mechanism 92, which includes a regulating wheel wear encoder 94, contacts wheel 90 to determine the wear of the regulating wheel. The assembly 54 is linearly movable by an actuator 96 rotating a ball screw 97 threaded in a nut 99 attached to the regulating wheel assembly 54. To determine the actual position of the assembly 54, an attached rack 104 meshes with a pinion 105 which drives a rotary encoder 107.

The work rest structure 56 includes a work rest blade 120 extending from a thru-feed jack 122. To monitor the position of the blade 120, a rack meshes with a pinion 125 which drives an encoder 126.

FIG. 3 is a sectional view of the powered outboard support rolls 40 or the inbetween guide roll stations 38. The rolls maintain the work bar 52 on a predetermined pass line through the grinding system. The solid circle having a diameter 130 represents a bar at the load side of the system, whereas the dashed circle having a diameter 132 represents a bar at the unload side of the system. A pair of guide rolls 134, 135 are radially movable with respect to the common center line by means of a structure 140 which moves the pair of rolls 134 and 135 along axes which intersect the center line. The position of the rolls is monitored by means of a rack which engages a pinion 142 which drives a roll position encoder 144. As is well known in the cylindrical grinder art, the extent to which the powered rolls 134 and 135 are canted (by conventional structure not shown) and rotated determines the speed of axial movement of the work bar.

In FIG. 4, a section is illustrated of the load or unload tables 30 and 32. The angle of a storage rail 150 is determined by a table angle elevation jack 152 controlled by an actuator 154 having an associated height encoder 156. It will be appreciated that the storage rail 150 is elevated to the illustrated position when the table is to load bars 52 onto the powered outboard support rolls, whereas the storage rail 150 has an opposite or downwardly slanting angle when the table is to serve as an unload station. The angle of the storage rail 150 with respect to horizontal is changed depending on the diameter of the work bars 52.

Considering the operation of the table when loading bars, as illustrated, a stop arm 160 is normally maintained in a raised position to hold a plurality of bars 52 on the storage rail 150. When a bar is to be released, a cylinder 162 rotates the stop arm 160, releasing the series of abutting bars which all roll downward toward a release arm 165, which at this time is in its raised position shown by the dashed lines. Cylinder 162 then raises the stop arm 160, thereby separating a single bar held by the release arm 165 from the remainder of bars on the storage rail 150. The release arm 165 is then lowered under control of a cylinder 170, causing the single bar to roll onto a load arm 172 which lowers it onto the powered outboard support rollers (not illustrated). The bar is then driven by the powered rollers to the first grinding station.

The height to which stop arm 160 may be raised is adjustable to compensate for different bar diameters. The position of the cylinder 162 is controlled by means of a cylindrical position screw 175 driven by an actuator 176 which has an attached encoder 177. The height of the release arm 165 is similarly adjustable to compensate for different bar diameters, and is controlled by a cylindrical position screw 180 driven by an actuator 182 which has an integral encoder 183.

The centerless grinding system illustrated in FIGS. 1-4 is of a known configuration, and its operation will not be described in detail. During a set-up mode, the system is automatically adjusted to grind work bars of a different diameter, by means of the apparatus illustrated in the remaining figures. During a run mode, certain running changes can be made by means of the apparatus to be described.

The pre-gauge and post-gauge bars which are being loaded and unloaded, respectively, a process gauging station 200 is located at any suitable position on the load/unload tables 30 and 32. As seen in FIG. 5, each process gauging station 200 is mounted relative to a storage arm 205 holding a single bar 52 against a release arm 207 which may be similar to the previously described stop arm 160 and/or release arm 165. An upright beam 210 mounts a low pressure cylinder 212 which drives a slide 214 downward against the top of the bar 52, which is fed into position through the side by manual or conventional automatic loading apparatus. A rack located on the slide 214 engages a pinion 216 connected to an encoder 220 which monitors the height of the slide 214 above the rail 205, and hence the diameter of the bar 52. If desired, the beam 210 could be made movable with respect to rail 205, in order to increase the range of bars which could be measured, or to withdraw the gauge 200 while bars aere being loaded or unloaded.

In order to measure the diameter of bars which are in-process, a plurality of in-process gauging stations 230 are each associated with a different grinding station 35. As seen in FIG. 6, a pair of gauging probes 232 are each mounted to a threaded flange 234 driven by a ball screw 236 under control of an actuator 240. The pair of probes 232 are simultaneously driven toward or away from each other, so as to be equally spaced from the predetermined pass line for the bars 52. Each probe 232 includes a proximity sensing element which does not contact the bar 52 being sensed, which is of course being driven both circumferentially and longitudinally by the powered rolls. A typical sensor may allow, for example, a gap of 0.060 inches between the tip of the sensing probe element and the bar 52 being sensed. encoder 242 determines the separation distance of the pair of probes, hence the diameter of the bar 52 at that particular in-process gauging station 230.

In FIG. 7, a master controller/computer 300 is illustrated in conjunction with controllers for the individual controlled components of the grinding system. Each grinding station controller is similar and comprises a head control 310 for controlling actuator 72 in FIG. 2, a regulating wheel control 312 for controlling actuator 96, and a blade control 314 for controlling the conventional actuator which moves the blade 120.

Guide rolls 38 of FIG. 1 are driven by a conventional actuator controlled by a guide roll control 318, associated with each set of guide rolls between grinding stations. The outboard powered guide rolls 40 of FIG. 1 are controlled by a left outboard roll control 320 and a similar right outboard roll control 322. Associated with each table 30 and 32 are a stop arm control 326 for controlling cylinder 162 of FIG. 4, a release arm control 328 for controlling the release arm cylinder 170, and a height control 330 for controlling the actuator 154.

The thru-feed rate of the system is controlled by a variable frequency speed control 335 which generates a variable frequency AC signal coupled to AC motors driving the powered rolls. Control 335 may comprise a vari-dyne excitor, having a frequency varied in a conventional manner by an actuator controlled by an input control signal.

While master controller 300 is illustrated in FIG. 8 as a hard wired unit, it may be formed by a programmable computer having a program which performs the steps carried out by the circuitry shown in FIG. 8. The controller includes an actual input size storage unit 400, responsive to the preprocess gague 200 or to a manual selectable input 402, to store the diameter of the bar being loaded. When the bar size changes, a set-up mode is initiated to adjust the controlled components to the appropriate positions. The desired final bar diameter may be determined either automatically or manually, and is stored in a final diameter preset memory 406.

The difference between the actual input size and the final desired size represents the amount of material to be removed. The controller, in response to this difference, determines the amount of material which each grinding station should remove. This material amount corresponds to a particular "offset" which represents the distance the associated grinding station should be spaced from the desired final bar diameter. The largest offset for grinding station 1 is stored in a device 1 offset memory 408-1, the next largest offset for grinding station 2 is stored in a device 2 offset memory 408-2, and so on until reaching the final offset (generally zero or finish grind) for the last grinding station N, stored in a device N offset memory 408-N. A sequence control 416 controls the timing of the calculations and actuation of the station controllers.

By way of example, it will be assumed that bars input at the left load table 30, and output at the right load table 32. If the flow was reversed, the connections to the outputs of units 400 and 406 would of course be switched. The operation is as follows. A new bar size, detected by the preprocess gauge 200, inputs signals which are registered in the actual input memory 400. In response to the sequence control 416, the controller calculates the difference between the data in units 400 and 406, and calculates the proper offsets which are recorded in the offset memories 408-1, 408-2 and 408-N. When all calculations are completed, the sequence control 416 causes controller 300 to output control signals in a desired sequence determined by the speed of response of the controlled elements. The actual input size is coupled directly to the left outboard roll control 320 and the control units associated with the left load table 30, since the bar is inputting from the left.

The actual input size is also coupled to the speed control 335, in order to adjust the thru-feed rate of the system. For example, control 335 may be responsive to an indication of a 1 inch diameter bar to set a thru-feed rate of approximately 40 feet a minute. This rate is continuously scaled down as the bar size increases, so that for a 6 inch diameter bar, for example, the thru-feed rate might be approximately 3 or 4 feet a minute. Of course, the most optimum rate will vary depending on the construction of the particular grinding system.

Each device offset memory 408 transmits its station offset information to its associated grinding station, and to the guide roll control 318 located downstream therefrom. As will appear, the desired final diameter data from memory 406 is also coupled to these same units. The station controllers and roll controls then adjust their controlled components to the proper positions represented by this data.

In FIG. 8, the master controller/computer 300 is illustrated in detail. When a work bar is properly oriented with respect to the preprocess gauge, pulses pass from the encoder 220 on the gauge to actual input size unit 400, in the form of an up/down counter which accumulates the pulses. Standard diameter sizes are prerecorded in a range selection unit 436 for comparison with the actual recorded input size. The output of range selection unit 436 is the precorded standard size which is closest to but less than the actual input size. For example, if the bar being measured is from 6.020 to 6.030 inches, it will be ground to a final standard bar size of 6.000 (plus or minus a 0.001 inch tolerance). Thus, selector 436 couples a data signal representing 6.000 to final diameter preset 406. If desired, any final diameter other than the prerecorded standard sizes can be selected through an external input 440 which over-rides any automatic range selection.

In a subtractor 444, the actual input size from unit 400 is subtracted from the desired final diameter from unit 406, resulting in a difference which is coupled to a difference counter 446 and a difference storage 448. This difference represents the amount of material which must be removed by the grinding system.

Each grinding station may remove a different amount of material. For a five station grinding system, for example, grinding station 1 may be selected to remove 45 percent of the stock, grinding station 2 another 45 percent of the stock, grinding station 3 about 10 percent of the stock, with grinding stations 4 and 5 having no stock removal, i.e., finish grind only. Of course, other percentages or ratios could be selected as desired. Each preselected percentage or ratio is recorded in device percent memories 450, 452, 454 corresponding to each grinding station. Memories 450, 452 and 454 are coupled to gates 456, 457 and 458, respectively, which are controlled by a device ring counter 460. The ring counter is enabled by the first output of sequence control 416, which itself may comprise a ring counter or a stepping unit. The output of the gates 456, 457 and 458 are coupled through an OR gate 463 to a fractional multiplier 465.

In operation, sequence control 416 is first enabled after counter 446 and storage 448 contain the calculated difference or subtraction data. At this time, the first output from sequence control 416 enables ring counter 460, producing a gating output on line 1. This causes gate 456 to open and pass the preselected device percentage data from unit 450 to the fractional or ratio multiplier 465. Thereafter, an oscillator 470 is enabled to generate pulses which step down the difference counter 446 towards zero. Each step of the counter 446 generates one output pulse, with the total number of output pulses corresponding to the necessary total system stock removal. Fractional multiplier 465 passes a percentage or ratio of these pulses as determined by the preselected data stored in unit 450. The pulses which are passed are counted in an offset counter 472. The fractional multiplier 465 may take any known form, such as is conventional in numerical control or NC for controlling feed rate.

A subtractor 476 compares the total desired stock removal with the stock removal to be produced by a particular grinding machine. The output of subtractor 476 is coupled to a gate 478, now enabled by the output line 1 of ring counter 460, passing the information to Device 1 offset memory 408-1. Thus, memory 408-1 stores a number indicating the amount of offset for grinding station 1, with reference to the desired final diameter. It will be appreciated that the percentage storage units 450, 452 and 454 may store either the actual percentage of stock removal, or the difference of that amount from 100 percent, depending on whether the offset is referenced to the final desired bar size or the actual input size, respectively.

After memory 408-1 stores the calculated offset, ring counter 460 is enabled and steps to output 2, enabling the gate 457 and a gate 480. The difference counter 446 is reset, and oscillator 470 is again enabled to repeat the previously described sequence. This cycle is repeated for each station through N, finally enabling gate 458 and a gate 482. At the completion of all calculations, ring counter 460 steps to N+1, enabling the sequence control 416. The sequence control now enables output line b.

All of the regulating wheel controls 312 and blade controls 314 for all grinding stations are enabled in response to the b output. This output may also enable coupling of the actual input size in memory 400 to the left outboard roll control 320 and to the controls 326, 328 and 330 for the left load table 30, as seen in FIG. 7. The actual input size is also coupled to the speed control 335 to determine the thru-rate speed of the system. The final diameter preset information in memory 406 is also coupled to the right outboard roll control 332, and to the controls 326, 328 and 330 for the right load table 32.

After all regulating wheels and blade controls have completed movement, they enable the input of sequence control 416, stepping the output from line b to line c. This enables the head controls 310 for each of the grinding machines. Since the grinding head moves faster than the regulating wheel and blade control, and since a known mechanical linkage may exist between the regulating wheel and the head axis for the purpose of preventing accumulative positioning error, simultaneous energization of all controls could produce a hunting or oscillating situation. For this reason, the regulating wheel and blade are first driven to their set positions, after which the grinding head is positioned.

Figure 9:
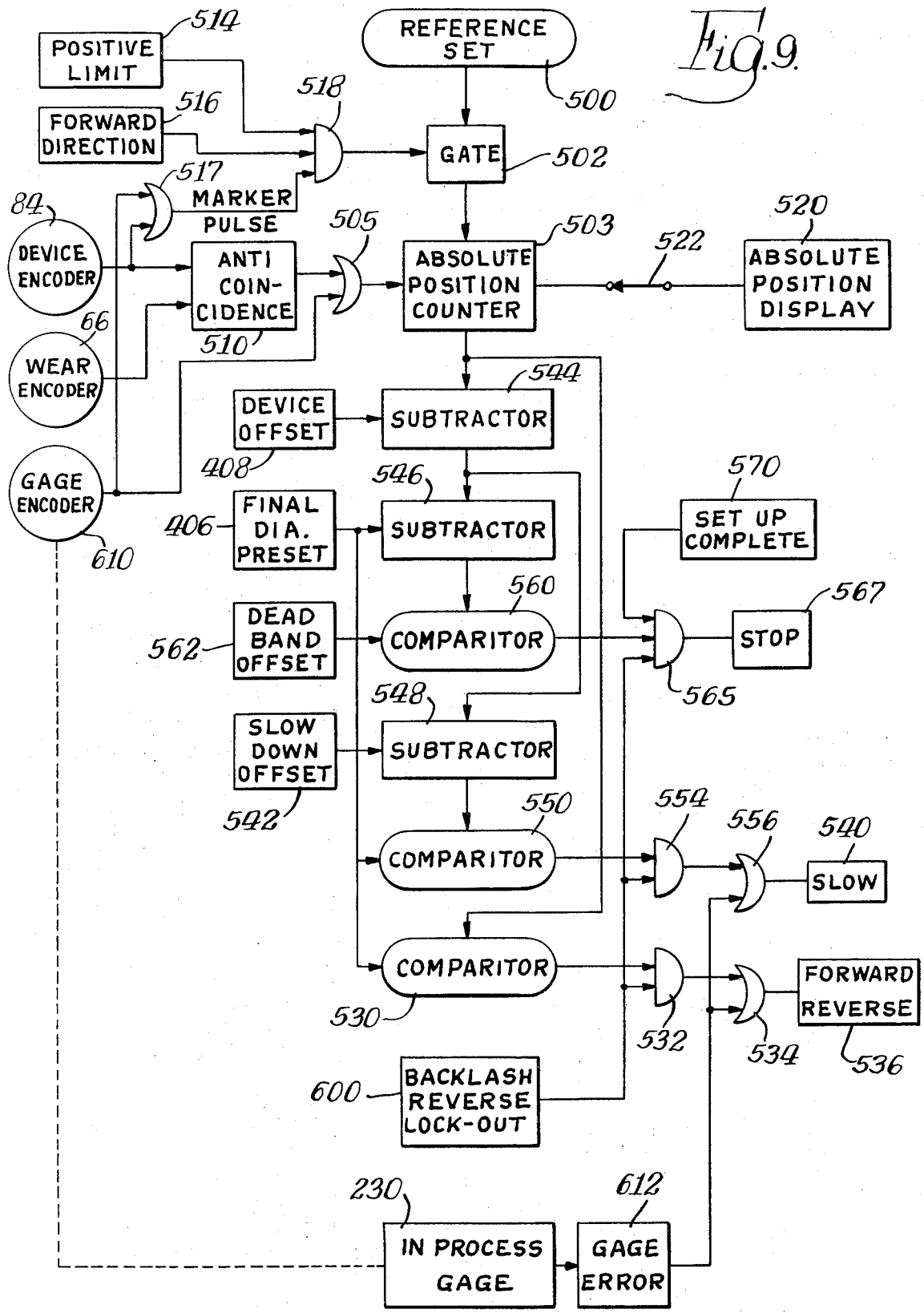
FIG. 9 is a partly block and partly schematic diagram of a controller used to control the head, blade, regulating wheel, and guide rolls shown in FIG. 7.

Regulating wheel control 312, blade control 314, head control 310 and guide roll control 318 for each of the grinding stations may take the general form illustrated in FIG. 9. The circuit illustrated is for the head control, it being appreciated that portions of the circuit would not be used for the other controls which are not as critical.

Turning to FIG. 9, the circuit for head control 310 is illustrated. A reference distance is recorded in a reference set memory 500, which represents a known reference point at which the head trips a positive limit switch 514 (for providing a cross-reference indication) and a "marker pulse" is generated by the device encoder 84 (for providing a precise reference position, beyond the calibration accuracy of a mechanical limit switch).

When the head is driven to the predetermined reference point, the reference distance in memory 500 is passed through a gate 502 to an absolute position counter 503, in the form of an up/down counter. As the head is moved back from this reference point, pulses from encoder 84 are passed through an OR gate 505 so that counter 503 continuously records the actual absolute position of the grinding head. Once the reference data has been entered in counter 503, it is blocked by the opening of gate 502. Only when the head is again driven to its reference position, actuating a positive limit switch 514, and is driven forwardly as indicated by forward direction circuit 516, will an AND gate 518 pass the marker pulse to open gate 502 and again enter the reference data in counter 503. As the abrasive belt wears, the wear encoder 66 generates pulses which are passed by an anti-coincidence circuit 510 to counter 503, compensating for any belt wear.

An absolute position display 520 can be connected through a multi-position rotary switch 522 with the absolute position counter 503 associated with any of the controls using the circuit of FIG. 9. This allows an operator to visually observe the actual position of any selected controlled component.

Once the circuit of FIG. 9 is actuated by the sequence control, the data in counter 503 is coupled to a comparator 530 having a second input connected with the final diameter preset 406. The difference between the actual and desired final distances determines the necessary direction of movement for the head. This difference, i.e., a positive or negative indication, is coupled through an AND gate 532 and an OR gate 534 to a forward or reverse direction of travel circuit 536.

The head actuator is now enabled and moves the head through a fast speed of traverse towards the calculated position for that station, which in turn is equal to the desired final diameter plus the offset (disregarding for now the deadband of the system). At a predetermined advance distance, a slow circuit 540 is actuated to cause the head actuator to assume its slow speed of traverse. This slow speed operation can be initiated at any desired distance, and is prerecorded in a slowdown offset memory 542.

In a subtractor 544, the calculated device offset amount is subtracted from the output of the absolute position counter 503. The difference information is coupled to a pair of subtractors 546 and 548. The other input of subtractor 548 is the slowdown offset memory 542. The resultant difference is coupled to a comparator 550, whose other input is the final diameter preset. When comparator 550 has a zero output or match, it indicates that the head has reached the slowdown position. This match is coupled through an AND gate 554 and an OR gate 556 to the slow circuit 540, causing the head actuator to assume its slow speed of traverse.

Returning to subtractor 546, its remaining input is from the final diameter preset memory 406. Due to overshoot in the head drive, the stop position does not correspond to a zero output from subtractor 546, but rather to an output offset therefrom by the deadband or overshoot of the system. This deadband is prerecorded in a deadband offset memory 562. A comparator 560 has inputs coupled to the subtractor 546 and memory 562. When comparator 560 detects a match, a pulse is passed through an AND gate 565 to a stop control 567, terminating energization of the head actuator. After completion of the set-up mode, a circuit 570 generates an output which opens AND gate 565.

To eliminate mechanical backlash, the grinding head when traveling from a lower number to a higher number is allowed to overshoot the set point and return from the opposite direction. Thus, the final positioning of the head is always accomplished from the same direction. For this purpose, a backlash reverse lock-out circuit 600 has outputs which block AND gates 532, 554 and 565 whenever the direction circuit 536 assumes one direction. This allows the head to be driven to its maximum limit, or to overshoot by some fixed amount as 1.000 inches, and then return in the opposite direction.

This completes the set-up mode for the grinding system. If desired, the position of the grinding stations can be adjusted during a grinding operation or run mode, by use of the in-process gauge 230. The device encoder 84 and wear encoder 66 are not functional during this time. Prior to on-line positioning, the in-process gauge is placed between the regulating wheel and the grinding head to set a reference distance. Thereafter the gauge is moved to a read position downstream from the station. In the read position, any difference from the preset reference distance generates in a gauge error circuit 612 pulses which pass through OR gates 534 and 556 to control head positioning based on the sensed error. To automatically correct for this error during a later set-up mode, gauge 230 also controls a gauge encoder 610 which enters any necessary correction factor in the absolute position counter 503.

FIG. 10 shows additional circuits necessary for height control 330 in a system in which the feed direction can be reversed. Elements performing a function corresponding to similar elements in FIG. 9 have been identified with the same reference numeral, followed with a prime ('). A circuit 700 is enabled when work bars are to travel from left to right as viewed in FIG. 1, whereas when travel is to be in the reverse direction, a circuit 702 is enabled. Assuming the work bars are to travel from left to right, circuit 700 enables a gate 710 and via a line 712 enables an AND gate 518'. A signal passes through an OR gate 714 to the absolute position counter 503', which now functions to control the height of the left load table 30. Enabled gate 710 passes pulses from device encoder 56 through an OR gate 720 to counter 503', which thus continuously records the height of the left load storage rail 150.

To control the height of the rail 150, counter 503' is coupled to a coincidence circuit 522 having an input coupled to a final diameter preset 406, which herein corresponds to the desired height of the storage rail 150. When the two inputs to coincidence circuit 722 match, an output is passed through an enabled gate 728 to a stop control 730. The operation of the right to left portion of the circuit is generally similar, except that a gate 740 and a line 742 would be enabled in place of gate 710 and line 712. In addition, the output of coincidence circuit 722 would be gated through a gate 745 to a stop control 750 for the right load table.

The automatic controls shown in the drawings may be supplemented with conventional manual controls for controlling movement of corresponding components. Such manual controls could include jog switches for moving the head, regulating wheel and blade, for example. Other modifications can be made without departing from the invention.

We claim:
1. A grinding system, comprising:
a plurality of grinding machines each having a grinding head with a grinding element and work support means for supporting work bars of different size, a plurality of machine motor means each corresponding to a different one of said plurality of grinding machines for controlling relative movement of corresponding ones of said grinding head and said work support means toward and away from each other to accomodate therebetween work bars of different size;
input gauge means effective prior to grinding and responsive to the size of a work bar for generating a size signal proportional thereto; and
set-up means automatically responsive to said input gauge means for energizing said machine motor means to position said system for a new work bar of different size, including a plurality of variable offset means each controlling a corresponding one of the machine motor means for producing a variable amount of relative movement of the corresponding grinding machine in proportion to the size signal from said input gauge means.

2. The grinding system of claim 1 wherein said set-up means further includes preset means for establishing a desired output size for said new work bar, subtraction means responsive to said input gauge means and said preset means for determining a total amount of stock to be removed from said new work bar, allocation means for allocating different portions of said total amount to different of said plurality of grinding machines, and coupling means for coupling said different portions to the plurality of variable offset means.

3. The grinding system of claim 2 wherein each of said plurality of variable offset means includes a memory means for storing data representing said different portions, and coupling means to individually couple each memory means to the motor means corresponding to the associated grinding machine.

4. The grinding machine of claim 3 wherein said allocation means comprises a plurality of device means each establishing a percentage of stock removal for an associated grinding machine, a common multiplier means responsive to individual of said device means and said subtraction means for determining said different portions, and said plurality of memory means storing the different portions calculated by said common multiplier means.

5. The grinding system of claim 4 wherein said set-up means includes counter means for sequentially energizing a plurality of output lines, a plurality of gate means effective when enabled for coupling said common multiplier means between one of said plurality of device means and a corresponding one of said plurality of memory means, said output lines of said counter means being coupled to said plurality of gate means.

6. A grinding system, comprising:
a plurality of grinding machines each having a grinding head with a grinding element and work support means for supporting work bars of different size, machine motor means for relatively moving said grinding head and said work support means toward and away from each other to accommodate therebetween work bars of different size;
powered feed means for feeding work bars to and from said grinding machines, including feed motor means for relatively moving said powered feed means to accommodate work bars of different size;

input gauge means effective prior to grinding for determining the size of a work bar; and
set-up means automatically responsive to said input gauge means for energizing said motor means to position said system for a new work bar of different size, including range selection means automatically responsive to the input size detected by said input gauge means for determining a desired final size for said new work bar and subtractor means responsive to a size difference between said range selection means and said input gauge means for controlling said motor means.

7. A grinding system, comprising:
a plurality of grinding machines each having a grinding head with a grinding element and work support means for supporting work bars of different size, machine motor means for relatively moving said grinding head and said work support means toward and away from each other to accommodate therebetween work bars of different size;
a plurality of powered feed means for feeding work bars to and from said grinding machines, each including at least a pair of spaced feed elements and feed motor means for relatively moving said feed elements to accommodate therebetween work bars of different size;
master control means for controlling said motor means to establish a series of decreasing distances between said grinding elements and work support means and between the pairs of feed elements, including
input means for indicating an input size of a new work bar,
final means for indicating a desired final size for said new work bar,
a plurality of storage means each corresponding to a different one of said plurality of grinding machines and powered feed means,
coupling means for connecting said plurality of storage means to corresponding motor means in order to position each grinding element and work support means and each pair of feed elements in accordance with data stored in said storage means, and
calculation means automatically responsive to said input means and final means to allocate decreasing amounts of the difference therebetween to different ones of said plurality of storage means.

8. The grinding system of claim 7 wherein said machine motor means comprises head motor means for moving said grinding head toward and away from said work support means and support motor means for moving said work support means toward and away from said grinding head, said calculation means allocating said series of decreasing amounts of the distance to maintain work bars of all diameters on a common preselected axis.

9. The grinding system of claim 7 wherein said calculation means comprises a plurality of device means corresponding to said plurality of grinding machines and said powered feed means, each device means establishing a predetermined ratio of the amount of material to be removed by the associated grinding machine, and means responsive to the predetermined ratios and the difference between said input size and desired final size for determining said decreasing amounts of the difference.

10. The grinding system of claim 7 including an in-process gauge means associated with at least one grinding machine for measuring the actual size of the work bar, and said coupling means includes in-process control means responsive to said in-process gauge means for altering the amount allocated.

11. A grinding system, comprising:
a plurality of grinding machines each having grinding head means with a grinding element, work support means spaced from said grinding head means for supporting work bars of different diameters therebetween, a plurality of motor means for relatively moving said grinding head means and said work support means to alter the distance separating said grinding head means and work support means to maintain said work bars on a preselected axis;
a plurality of roll assembly means spaced between said grinding machines for supporting and feeding work bars on said preselected axis to and from said plurality of grinding machines, motor means for moving said roll assembly means to alter the distance separating pairs of said roll assembly means to accommodate work bars of different diameters and to maintain said bars on said preselected axis; and
a master controller for determining different separating distances for said roll assembly means and between said grinding head means and associated work support means to maintain work bars of different diameters on said preselected axis, including sequence means for controlling said motor means in cascade to sequentially energize certain of said motor means and thereafter energize remaining of said motor means.

12. The grinding system of claim 11 wherein each of said work support means includes regulating wheel means and bar rest means, said plurality of motor members for each grinding machine comprises head motor means for moving said grinding head means toward and away from said preselected axis, regulating motor means for moving said regulating wheel means toward and away from said preselected axis, and rest motor means for moving said bar rest means toward and away from said preselected axis.

13. The grinding system of claim 12 wherein said sequence means has at least a first enabling output, a second enabling output, and a third enabling output, said master controller includes input means for establishing an actual diameter of a new work bar which is to be ground, output means for establishing a desired final diameter for said new work bar, calculation means enabled by said first enabling output for calculating said different separating distances in response to a difference in diameters established by said input means and output means, certain of said head motor means, said regulating motor means, and said rest motor means being responsive to said second enabling output to control movement of the associated means, and the remaining of said motor means being responsive to said third enabling output to control movement of the associated means.

14. The grinding system of claim 11 including input gauge means for determining the diameter of a new work bar which is to be ground by the grinding system, and said master controller includes set-up means automatically responsive to said input gauge means for determining said different separating distances.

* * * * *